E. W. BURGESS.
POWER LIFT MOWER.
APPLICATION FILED SEPT. 13, 1918.

1,404,431.

Patented Jan. 24, 1922.

Inventor.
Edward W. Burgess,
By Chas. E. Lord
Atty.

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

POWER-LIFT MOWER.

1,404,431.      Specification of Letters Patent.      Patented Jan. 24, 1922.

Application filed September 13, 1918. Serial No. 254,000.

*To all whom it may concern:*

Be it known that I, EDWARD W. BURGESS, a citizen of the United States, residing at Chicago, in the county of Cook and State of Illinois, have invented certain new and useful Improvements in Power-Lift Mowers, of which the following is a full, clear, and exact specification.

This invention relates to mowing machines and more particularly to lifting mechanism for adjusting the coupling frame and finger bar in varying planes.

The invention has among its objects to provide a lifting mechanism adapted for manual operation but which, when desired, may be operatively connected to a power actuated member.

More specifically stated, the object of the invention is to enable the operator to apply power derived from the main axle or one of the mower wheels to the usual lifting member or other lifting mechanism, thereby assisting the operator in raising the coupling frame and finger bar.

These objects are attained in the present embodiment by utilizing a flexible connecting member interposed between the lifting lever and a power driven member carried by the main axle, and means is provided for rendering this flexible connection operative to assist in raising the coupling frame.

Figure 1:
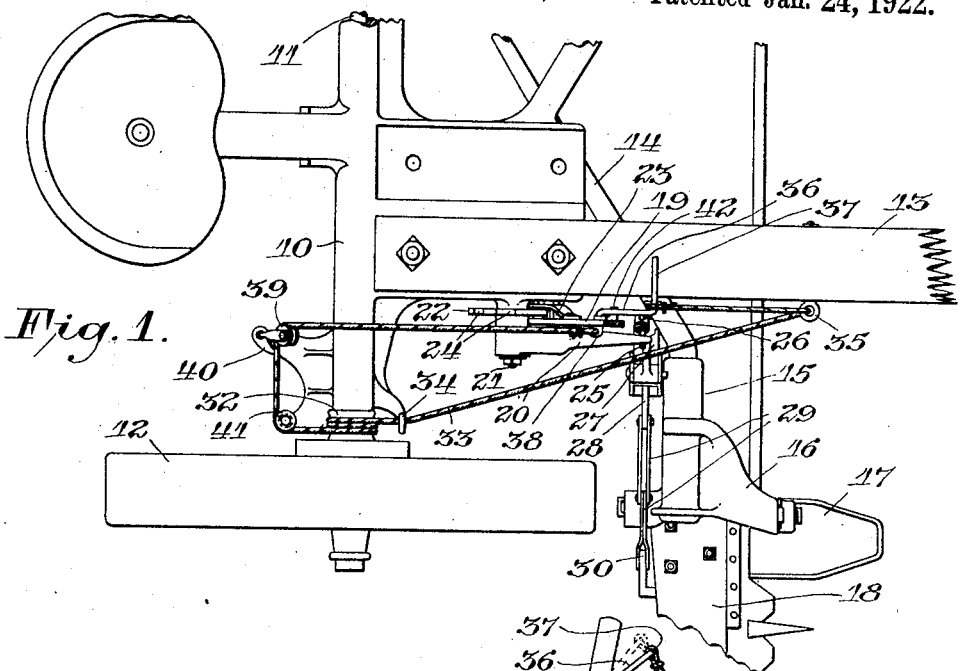
Figure 2:
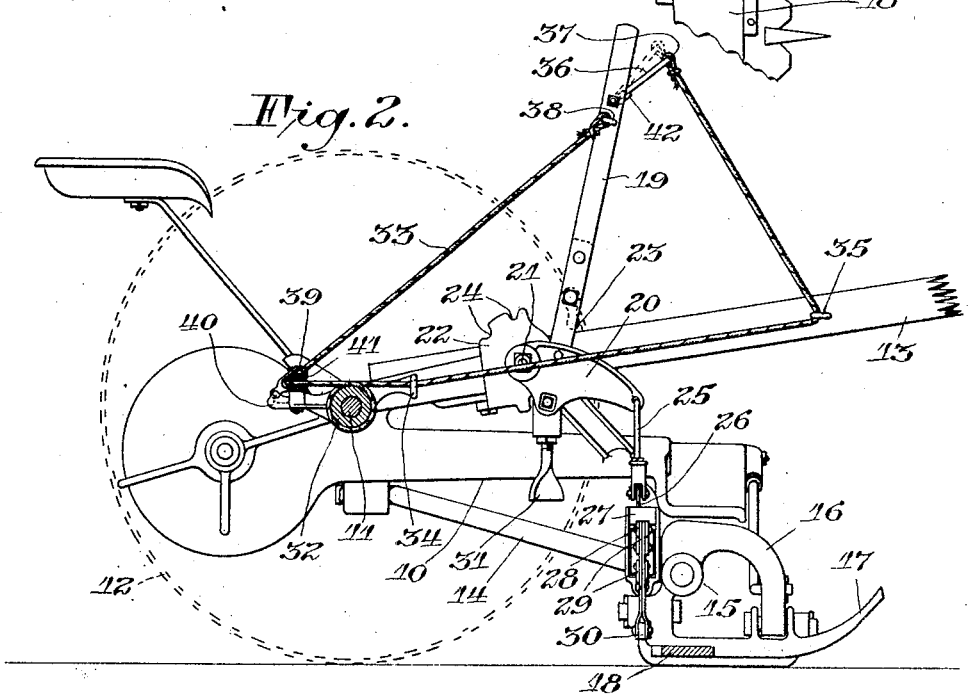

One embodiment of the invention is illustrated in the accompanying drawings, and, Figure 1 is a fragmentary top plan view of a mowing machine equipped with my improved lifting mechanism; and Fig. 2 is a side elevation of the construction shown in Figure 1.

The mowing machine includes the usual main frame 10 carried by an axle 11 which in turn is supported by mower wheels 12. A draft tongue 13 is supported on the main frame in any suitable manner. The usual coupling frame 14 is supported at one end on the main frame and at its opposite end carries a coupling frame 15 to which is pivotally connected the yoke 16. A shoe 17 is pivotally connected to the yoke 16 and carries the usual cutter bar 18.

In the present embodiment of the invention the lifting lever 19 is rigidly secured to an arm 20 pivoted at 21 to a sector 22 which in turn is rigidly secured to the machine frame. The lever 19 is provided with any suitable pawl mechanism 23 which coacts with notches 24 formed in the sector 22 to hold the coupling frame and finger bar in any desired position of adjustment. The front end of the arm 20 is connected by means of a link 25 to a link 26 which in turn is connected to a fulcrum member 27. The member 27 is also connected by means of links 28 and 29 to a projection 30 extending rearwardly from the cutter bar.

The details of the lifting mechanism have not been further illustrated in this application since they are substantially the same as those shown in Patent No. 1,240,361 to Pearson, granted September 18, 1917, and the specific connections of this mechanism constitute per se no part of the present invention, and any other suitable connections could be substituted therefor.

An adjustable stop 31 is secured to the underside of the frame of the machine and engages the coupling bar 14 as the coupling frame and bar are lifted. As explained in the patent above referred to, when the coupling bar engages the stop 31 the finger bar will swing on its pivot from a substantially horizontal to a substantially vertical position. In order to assist the operator in lifting the coupling frame and finger bar when the mower is in operation the following connections are employed: As shown in Figure 1, the inner portion of the hub of one of the wheels 12 is extended as shown at 32 to form a grooved drum. A flexible cable 33 is coiled around this drum 32 and one portion of the cable passes through an eye 34 formed on a portion of the machine frame, and from the eye 34 through a second eye 35 secured to the draft tongue, and thence to a pivoted member 36 carried by the lifting lever 19. The cable is secured to an inwardly projecting handle 37 formed on one end of the member 36, as clearly illustrated in Figure 1. The opposite end of the cable is secured to an eye 38 fixed on the lever 19 and from the eye 38 passes rearwardly around a sheave 39 swiveled to a rearwardly extending portion 40 on the machine frame, and from the sheave 39 around a sheave 41 and thence forwardly around the grooved drum formed on the hub of the wheel. A stop 42 is formed on the lifting lever 19 and normally supports the member 36 in the position illustrated in Fig. 2 in full lines. When the member 36 is so supported there is sufficient slack in the flexible cable 33 to permit the drum 32 to rotate without placing any tension on the cable; therefore, when the machine is stationary and the operator desires to lift the coupling frame and finger bar, it is merely necessary to grasp the lever 19 in the usual manner and draw it rearwardly. When, however, the machine is in motion the operator by moving the pivot member 36 to the position shown in dotted lines in Fig. 2, places a sufficient tension on the flexible member 33 to cause said member to grip the drum 32, whereupon the rotation of the wheel will cause the cable to wind upon the drum 32 and draw the lever 19 rearwardly, thereby lifting the coupling frame and finger bar.

From the above description it will be seen that I have provided an exceedingly simple connection between the power driven member on the mower and the usual lifting lever. It will also be seen that this connection interferes in no way with the ordinary manipulation of the lever and thereby will not interfere with the lifting of the cutter bar when the machine is at rest. However, by simple manipulation of the cable tightening member, power may be utilized in raising the coupling frame when the machine is in motion.

Attention should also be called to the fact that this attachment consists of very few parts and may be applied to any ordinary manual lift such as those now in use on machines of this type.

While I have in the above specification described one embodiment which my invention may assume, it should be understood that the invention is capable of modification and that modifications may be employed without departing from the spirit and scope of the invention as expressed by the following claims:

1. In combination, a frame, a power shaft, a traction wheel thereon, a member adjustable relative to said frame, a lever for adjusting said member, a member secured to said traction wheel and rotatable therewith, and flexible means having both of its ends connected to said lever and a portion intermediate its ends engageable with said last mentioned member for adjusting said first mentioned member.

2. In combination, a frame, a power shaft, a member adjustable relative thereto, means for manually adjusting said member, flexible means connecting said manually adjusting means directly to said power shaft, and means carried by said manually adjusting means for rendering said connecting means operative.

3. In combination, a frame, an axle carried thereby, wheels carried by said axle, a member adjustable relative to said frame, means for adjusting said member, flexible means connected to said adjusting means and extending rearwardly and connected to one of said wheels, and pivoted means connected with a forward extending portion of said flexible means for rendering said connecting means operative.

4. In combination, a frame, supporting wheels therefor, a member adjustable relative to said frame, a lever for manually adjusting said member, flexible means connecting said adjusting means to one of said wheels, and means pivoted to said lever for rendering said flexible connecting means operative.

5. In combination, a frame, supporting wheels therefor, a member adjustable relative to said frame, means for manually adjusting said member, flexible means connecting said manually adjusting means to one of said wheels, and means for placing a tension on said flexible connecting means.

6. In combination, a frame, supporting wheels therefor, a member adjustable relative to said frame, lever mechanism for adjusting said member, flexible means connecting said lever mechanism to one of said supporting wheels, and means carried by said lever mechanism for placing said flexible connecting means under tension.

7. In combination, a frame, supporting wheels therefor, a member adjustable relative to said frame, lever mechanism for adjusting said member, and means including a flexible member fixedly secured at one end to said lever mechanism and adjustably secured at the other end to said lever mechanism for connecting said lever mechanism to one of said supporting wheels.

8. In a mowing machine, a frame, a coupling frame adjustably carried thereby, lever mechanism for manually adjusting said coupling frame, supporting wheels for said frame, a member carried by said frame and rotated by one of said supporting wheels, flexible means connecting said lever mechanism with rotatable member, and means carried by said lever mechanism for placing said flexible member connecting means under tension.

9. In a mowing machine, a frame, a coupling frame adjustable with respect thereto, lever mechanism for adjusting said coupling frame, supporting wheels for said frame, a drum connected to one of said supporting wheels, a flexible member coiled around said drum and fixedly connected at one end to said lever mechanism and adjustably connected at its other end to said lever mechanism.

10. In a mowing machine, a frame, supporting wheels carried thereby, a coupling frame adjustably carried by said frame, means including a lever for raising and lowering said coupling frame, a rotatable drum carried by said frame and actuated by power derived from one of said supporting wheels, and flexible means connected to said lever and extending in opposite directions therefrom for frictionally connecting said drum to said adjusting means.

11. In a mowing machine, a frame, a supporting wheel therefor, a coupling frame adjustably carried by said frame, a lever for manually adjusting said coupling frame, flexible means cooperating with said wheel to adjust said coupling frame and being normally slack and inoperative, and means mounted on said lever for rearward movement for rendering said flexible means taut and operative.

12. In a mowing machine, a frame, a power shaft, a coupling frame adjustable relative to said frame, flexible means loosely embracing said power shaft, and a member independent of said power shaft for tightening said flexible means around said power shaft to adjust said coupling frame.

In testimony whereof I affix my signature.

EDWARD W. BURGESS.